June 1, 1937.  C. P. WEST ET AL  2,082,038
REMOTE SIGNALING SYSTEM
Filed Nov. 8, 1934
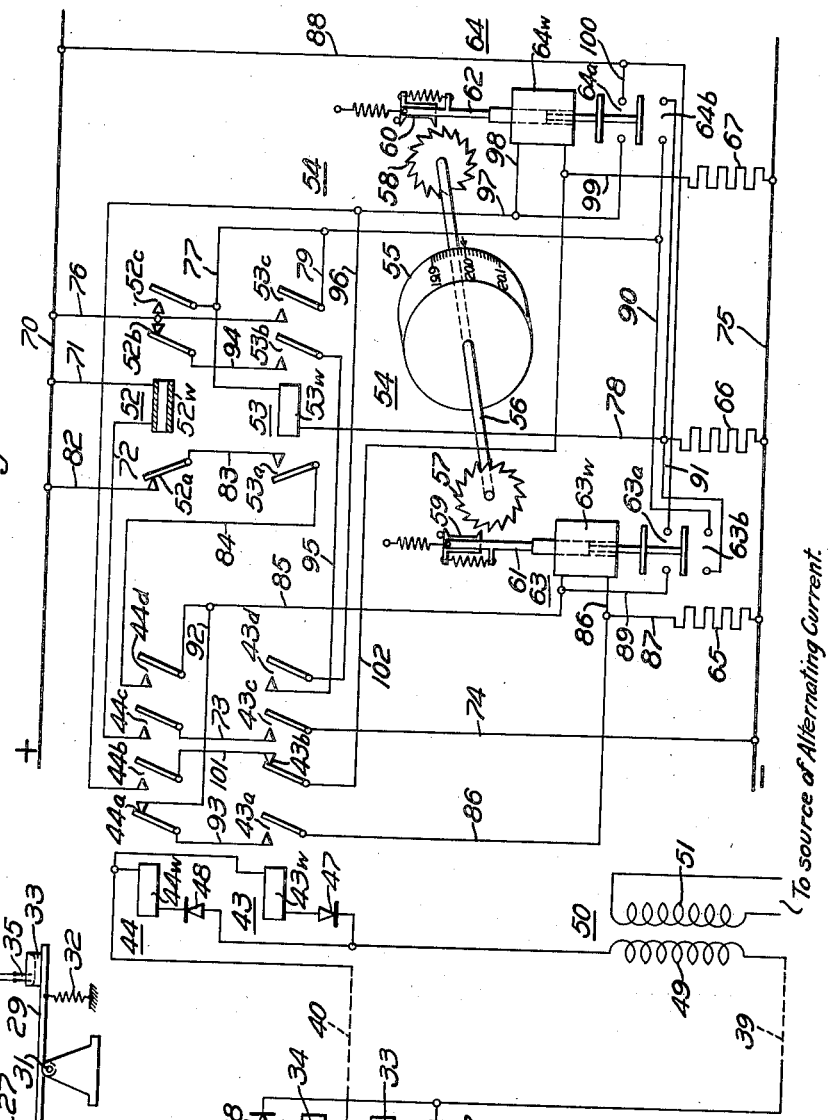
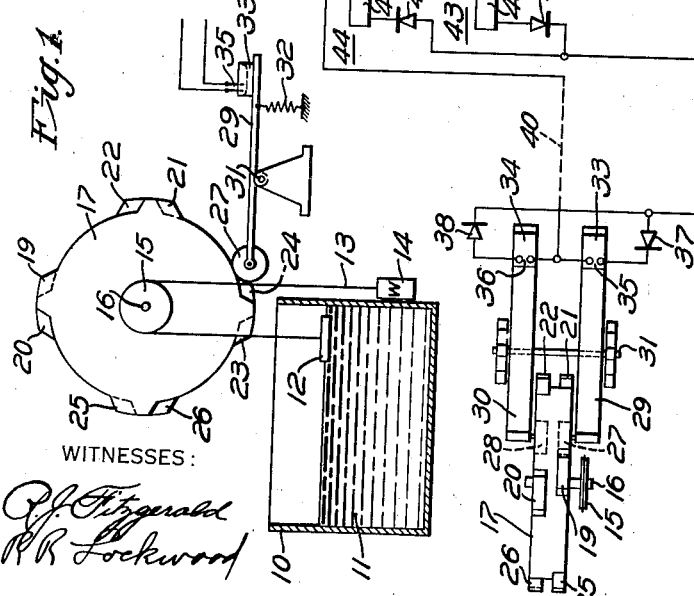
WITNESSES:
INVENTORS
Charles P. West and
Burt S. Burke.
BY
ATTORNEY Patented June 1, 1937

2,082,038

UNITED STATES PATENT OFFICE 2,082,038

REMOTE SIGNALING SYSTEM

Charles P. West, Edgewood, Pa., and Burt S. Burke, Elizabeth, N. J., assignors to Westinghouse Electric & Manufacturing Company, East Pittsburgh, Pa., a corporation of Pennsylvania Application November 8, 1934, Serial No. 752,104

13 Claims. (Cl. 177—351)

Our invention relates generally to signaling systems, and it has particular relation to signaling systems for transmitting an indication of the magnitude of a variable quantity, such, for example, as the level of a liquid to a remote point.

It is often desirable to have an indication at a remote point of the level of the liquid in a tank which may be located at what is commonly known as a tank farm. These tank farms are located along oil pipe lines and are provided for storing excess oil until it is needed for the market or for other purposes.

It is also desirable to obtain the level of the water in the pool behind a dam and to indicate it to the operator at a hydro-station which may be operated from water power. While this invention may be employed for obtaining such an indication, it will be described in connection with obtaining the level of a liquid in a tank, but it will be understood that it is not to be restricted thereto.

In order to use the storage space in the tanks most advantageously, it is desirable to have an indication of the level of the liquid in each of them at a common control point. The system supervisor can then more properly and efficiently control the flow of oil through the pipe lines and at all times he will be informed as to the amount of oil remaining in the tanks or the amount of storage space which is available.

In order that such a system may be practicable, it is desirable that it be accurate to approximately one-eighth of an inch in a total range of indication of forty feet of the depth of the liquid. The means which is used to obtain the level of the liquid in the tank should be such that there is no likelihood of the generation of a spark which might cause an explosion in the highly inflammable atmosphere of the tank.

Another feature which is desirable is that the system should be relatively slow to operate in the event that surges occur in the surface of the liquid. When an electrical indicating system is used, it is desirable that the number of conductors required be limited to a minimum in view of the expense which is involved in employing a relatively large number of conductors.

The object of our invention, generally stated, is to provide a remote indicating system which shall be simple and efficient in operation and which may be readily and economically manufactured and installed.

The principal object of our invention is to provide for indicating at a distant point the magnitude of a variable quantity at another station.

Another object of our invention is to provide for sequentially applying and removing impulses to and from a signaling circuit in accordance with the increase or decrease in the magnitude of a variable quantity and operating an indicator in response thereto for showing the magnitude of the quantity.

Still another object of our invention is to provide for applying positive and negative impulses to a signaling circuit and removing them therefrom in a predetermined sequence, depending upon the rise or fall of the level of a liquid for operating an indicator which is adapted to show the level of the liquid.

Other objects of our invention will, in part, be obvious and, in part, appear hereinafter.

Our invention accordingly is disclosed in the embodiment hereof shown in the accompanying drawing and comprises the features of construction, combination of elements, and arrangement of parts which will be exemplified in the construction hereinafter set forth and the scope of the application of which will be indicated in the appended claims.

For a more complete understanding of the nature and scope of our invention, reference may be had to the following detailed description, taken in connection with the accompanying drawing, in which:

Figure 1 is a view in side elevation of the portion of the signaling system which is located at the tank, the tank being shown partially in section in order to more clearly illustrate the invention, and Fig. 2 illustrates diagrammatically the circuit connections which may be employed in practicing our invention.

Referring now particularly to Fig. 1 of the drawing, reference character 10 designates a tank containing a liquid 11 such as oil. In order to obtain an indication of the level of the liquid 11, a float 12 is provided which is connected by means of a rope 13 to a counter-balancing weight 14.

As illustrated, the rope 13 is arranged to pass over a pulley 15 which is secured to a shaft 16 on which a cam wheel 17 is mounted for rotation therewith. It will be observed that the cam wheel 17 is provided with cams 19, 21, 23, and 25 on one side and cams 20, 22, 24, and 26 on the other side. The cams 19, 21, 23, and 25 lead, respectively, the cams 20, 22, 24, and 26 in a clockwise direction by a few degrees for a purpose which will be set forth hereinafter.

The odd numbered cams are arranged to engage a roller 27, while the even numbered cams are arranged to engage a roller 28. The rollers 27 and 28 are carried, respectively, by levers 29 and 30 which are rotatably mounted on a shaft 31. Springs 32 are provided, as illustrated, for biasing the levers 29 and 30 in a clockwise direction to maintain the rollers 27 and 28 in engagement with the surface of the cam wheel 17.

Line switches 33 and 34, having terminals 35 and 36, are respectively mounted on the levers 29 and 30. The line switches 33 and 34 are preferably of the mercury type which are arranged to be tilted by engagement of the rollers 27 and 28 with the surface of the cam wheel 17, so that the mercury will complete the connections between the terminals 35 and 36, as will be readily understood. In the position illustrated in Fig. 1 of the drawing, however, it will be observed that the terminals are not bridged by the mercury.

A rectifier 37 of the copper oxide type is provided individual to the line switch 33, while a similar rectifier 38 is provided with the line switch 34, but is oppositely connected.

As illustrated in Fig. 2 of the drawing, the line switches 33 and 34 and the rectifiers 37 and 38 are connected by means of a signaling circuit comprising conductors 39 and 40 to a system which may be located at a point remote from the location of the tank 10 and which may be a central control point at which the system supervisor is located. The conductors 39 and 40 are represented by broken lines in order to indicate that a considerable distance, for instance several miles, may intervene between the storage station where the tank 10 is located and the distant station where it is desired to provide the indication of the level of the liquid in the tank.

A pair of line relays 43 and 44 having oppositely connected rectifiers 47 and 48, respectively, are provided at the distant station and connected to the signaling circuit through the secondary winding 49 of a transformer, shown generally at 50, having a primary winding 51 which may be connected to a source of alternating current. The combination of the line relays 43 and 44 with their individual rectifiers 47 and 48 provides, what may be termed, polarized relays. Since the rectifiers 47 and 48 are oppositely connected, the operating windings 43w and 44w of the line relays 43 and 44 will be energized only when positive or negative half cycles are applied thereto depending upon the connections of the rectifiers 47 and 48, as will be readily understood.

In response to the operation of both of the line relays 43 and 44, an auxiliary line relay 52, having an operating winding 52w will be operated. This relay is of the slow-to-deenergize or dropout type for a purpose which will be set forth hereinafter. The operation of the auxiliary line relay 52 completes an energizing circuit for the operating winding 53w of a control relay 53.

The deenergization of either of the operating windings 43w or 44w of the line relays, after both have been energized, serves to effect the operation of an indicator shown generally at 54, which is arranged to give to the supervisor a visual indication of the level of the liquid 11 in the tank 10. As shown in the drawing, the indicator 54 may comprise a cylindrical scale 55 which is carried by a shaft 56 and which is provided with graduations as indicated, corresponding to different levels of the liquid 11.

The shaft 56 is arranged to be turned in opposite directions by means of ratchet wheels 57 and 58 which are secured to the opposite ends thereof.

Pawls 59 and 60, which are pivotally mounted on armature extensions 61 and 62, are arranged to engage the teeth of the ratchet wheels 57 and 58. The armature extensions 61 and 62 are arranged as illustrated, to be moved downwardly by the operating windings 63w and 64w, respectively, of raise and lower relays 63 and 64.

Resistors 65, 66 and 67 are provided for permitting the operating windings 53w, 63w and 64w to be energized as long as the relays 53, 63 and 64 remain in the operated position, and further to provide for shunting them down at a predetermined time in the cycle of operation of this system which will be presently described.

In describing the operation of our signaling system, it will be assumed that the level of the liquid 11 is rising in the tank 10. The float 12 is then correspondingly moving upwardly and causing the cam wheel 17 to rotate in a clockwise direction.

The rotation of the cam wheel 17 in a clockwise direction first causes the cam 21 to engage the roller 27, thereby tilting the lever 29 and causing the mercury in the line switch 33 to bridge the terminals 35. A circuit is then completed for applying what may be termed a positive impulse to the line conductors 39 and 40 for effecting the energization of the operating winding 43w of the line relay 43. On tracing the energizing circuit for the winding 43w, it will be observed that the rectifiers 37 and 47 are indicated as being so connected as to conduct current in the same direction in the energizing circuit.

The continued rotation of the cam wheel 17 in the clockwise direction causes the cam 22 to engage the roller 28. The lever 30 is then tilted to such an extent that the mercury in the line switch 34 bridges the terminals 36 and completes a circuit through the rectifiers 38 and 48 for effecting the energization of the operating winding 44w of the line relay 44.

It will be understood that as long as the cams 21 and 22 are in engagement with the rollers 27 and 28, so that the contact members 35 and 36 are bridged, the operating windings 43w and 44w will both be energized and the line relays 43 and 44 will be operated. The circuit is then completed for effecting the energization of the operating winding 52w of the auxiliary line relay 52 which in turn completes a circuit for energizing the operating winding 53w of the control relay 53.

The circuit for energizing the operating winding 52w may be traced from an energized conductor 70 through conductor 71, operating winding 52w, conductor 72, contact members 44c, conductor 73, contact members 43c and conductor 74 to an energized conductor 75. The circuit for energizing the operating winding 53w may be traced from the energized conductor 70 through conductor 76, contact members 52c, conductor 77, operating winding 53w, conductor 78, and resistor 66 to the energized conductor 75.

The holding circuit for the operating winding 53w may be traced from the energized conductor 70 through conductor 76, contact members 53c, conductors 79 and 77, operating winding 53w, conductor 78 and resistor 66 to the energized conductor 75.

No further operation of the system can take place until one of the operating winds 43w or 44w of the line relays 43 and 44 is deenergized.

Assuming that the level of the liquid 11 continues to rise, the cam wheel 17 will then continue to rotate in a clockwise direction. Cam 21 will be moved out of engagement with the roller 27 and the mercury will no longer bridge the circuit between the terminals 35. The positive impulse which had been applied to the operating winding 43w will then be removed from the signaling circuit and the line relay 43 will drop out, opening at contact members 43c the energizing circuit for the operating winding 52w of the auxiliary line relay 52. The dropping out of the auxiliary line relay 52 completes, at contact members 52a, a circuit for energizing the operating winding 63w of the raise relay 63. It will be recalled that the operating winding 53w of the control relay 53 is maintained energized and that the line relay 44 is still in the operated position.

The circuit for energizing the operating winding 63w may be traced from the energized conductor 70 through conductor 82, back contact members 52a, conductor 83, contact members 53a, conductor 84, contact members 44d, conductor 85, operating winding 63w, conductors 86 and 87, and resistor 65 to the energized conductor 75.

The energization of the operating winding 63w serves to attract the armature of the raise relay 63 and causes the pawl 59 to engage the ratchet wheel 57, and to rotate the scale 55 in a counter-clockwise direction to indicate that the level of the liquid 11 has been raised.

The operation of the raise relay 63 completes at contact members 63b a circuit for shunting down the operating winding 53w of the control relay 53. At contact member 63a a circuit is completed for maintaining the operating winding 63w energized.

The circuit for maintaining the operating winding 63w energized may be traced from the energized conductor 70 through conductor 88, contact members 63a, conductor 89, operating winding 63w, conductors 86 and 87, and resistor 65 to the energized conductor 75.

The circuit for shunting down the operating winding 53w may be traced from the operating winding 53w through conductors 77 and 90, contact members 63b, conductors 91 and 79 back to the operating winding 53w.

The continued rotation of the cam wheel 17 in a clockwise direction finally causes the cam 22 to be removed from engagement with the roller 28. As a result the lever 30 is restored to the position illustrated in the drawing and the mercury in the line switch 34 no longer bridges the terminals 36. The operating winding 44w of the line relay 44 is then deenergized and this relay is moved to the non-operated position.

The continued rotation of the cam wheel 17 in the clockwise direction causes the cam 19 to engage the roller 27. The mercury in the line switch again bridges the terminals 35 and the operating winding 43w of the line relay 43 is energized. A circuit is then completed for shunting down the operating winding 63w of the raise relay 63 for restoring the indicator 54 to the normal condition.

The circuit for shunting down the operating winding 63w may be traced from the operating winding 63w through conductors 85 and 92, contact members 44a, conductor 93, contact members 43a and conductor 86 back to the operating winding 63w.

The system is now restored to receive the next impulse, and if the level of the liquid 11 continues to rise, the foregoing sequence of operations will be repeated.

It will be now assumed that the level of the liquid 11 falls and that the position of the cam wheel 17 is that in which it is illustrated in the drawing. The cam wheel 17 will be rotated in a counter-clockwise direction due to the fact that the float 12 moves downwardly. Cam 24 will first engage the roller 28 and cause the mercury in the line switch 34 to bridge the terminals 36, thereby effecting the energization of the operating winding 44w of the line relay 44. The continued rotation of the cam wheel 17 in the counter-clockwise direction causes the cam 23 to engage the roller 27. The terminals 35 are then bridged by the mercury in the line switch 33 and the operating winding 43w of the line relay 43 is energized.

Since both the line relays 43 and 44 are in their operated positions, the previously traced circuit is completed for effecting the energization of the operating winding 52w of the auxiliary line relay 52. In turn, the operating winding 53w of the control relay 53 is energized over a circuit which has previously been traced and this operating winding locks in over a holding circuit which also has been traced.

The continued rotation of the cam wheel 17 in the counter-clockwise direction finally moves the cam 24 out of engagement with the roller 28. The lever 30 is then restored to the position illustrated in the drawing and the terminals 36 are no longer bridged. The operating winding 44w is then deenergized and the line relay 44 is restored to the non-operated position.

A circuit is now completed for effecting the energization of the operating winding 64w of the lower relay 64. It will be recalled that the line relay 43 and the control relay 53 are still in their operated positions and that due to the opening of the contact members 44c, the energizing circuit for the operating winding 52w is opened.

The circuit for energizing the operating winding 64w may be traced from the energized conductor 70 through conductor 76, back contact members 52b, conductor 94, contact members 53b, conductor 95, contact members 43d, conductors 96, 97 and 98, operating winding 64w, conductor 99 and resistor 67 to the energized conductor 75.

The energization of the operating winding 64w attracts the armature of the lower relay 64 and causes the pawl 60 to engage the ratchet wheel 58. The scale 55 is turned in a clockwise direction and the resulting indication shows that the level of the liquid 11 has been lowered.

The operation of the lower relay 64 completes, at contact members 64b the previously traced circuit for shunting down the operating winding 53w of the control relay 53. In addition, at contact members 64a a holding circuit is completed for the operating winding 64w.

The holding circuit for the operating winding 64w may be traced from the energized conductor 70 through conductors 88 and 100, contact members 64a, conductors 97 and 98, operating winding 64w, conductor 99, and resistor 67 to the energized conductor 75.

The continued rotation of the cam wheel 17 in the counter-clockwise direction finally causes the cam 23 to move out of engagement with the roller 27. The terminals 35 are then no longer bridged and the operating winding 43w of the line relay 43 is deenergized.

The continued rotation of the cam wheel 17 in the counter-clockwise direction causes the cam 26 to engage the roller 28. The terminals 36 are again bridged and the operating winding 44w of the line relay 44 is energized. A circuit is then completed for shunting down the operating winding 64w of the lower relay 64.

The circuit for shunting down the operating winding 64w may be traced from the operating winding 64w through conductors 98 and 97, contact members 44b, conductor 101 contact members 43b, and conductor 102, back to the operating winding 64w.

The lower relay 64 is then restored to the non-operated position and the indicator 54 is ready to indicate a rise or fall in the liquid 11, depending upon whether the raise relay 63 or the lower relay 64 is next operated.

Assuming that the level of the liquid 11 rises in the previous description before the cam 26 engages the roller 28 and immediately after the lower relay 64 has been operated to move the scale 55 indicating a fall in the level of the liquid 11, the cam wheel 17 will be rotated in a clockwise direction. At this time, the operating winding 64w is energized and is maintained energized over the holding circuit which has previously been traced. At contact members 64b the operating winding 53w of the control relay 53 is short-circuited. It will then be understood that the control relay 53 cannot be operated until the operating winding 64w of the lower relay 64 has been deenergized and this relay returned to the non-operated position.

The cam 23 engages the roller 27 and causes the mercury in the line switch 33 to bridge the terminals 35. The operating winding 43w of the line relay 43 is then energized and this relay is closed.

The continued rotation of the cam wheel 17 in the clockwise direction causes the cam 24 to engage the roller 28. The terminals 36 are then bridged by the mercury in the line switch 34 and the operating winding 44w of the line relay 44 is energized.

The energizing circuit which has previously been traced for the operating winding 52w of the auxiliary line relay 52 is again completed and this relay is operated. However, the control relay 53 is not operated at this time, since its operating winding 53w is short-circuited, as has been set forth hereinbefore.

If the assumed rise in the level of the liquid 12 has been due to a sudden surge which may be the result of a sudden displacement in the liquid 11, the indicator 54 will not show this sudden rise. If the level of the liquid is restored to that which was indicated at the beginning of the last described cycle of functioning, the line relay 44 will be restored to the non-operated position and no further operation will take place.

However, assuming that the level of the liquid 11 continues to rise further, the cam 23 will be moved out of engagement with the roller 27. The terminals 35 will then be no longer bridged and the operating winding 43w of the line relay 43 will be deenergized.

Although the energizing circuit for the operating winding 52w has now been opened at contact members 43c, the auxiliary line relay 52 will remain in the operated position for a certain length of time due to its time delay characteristic in moving from the operated to the non-operated position.

It will be recalled that the line relay 44 is still in the operated position and that the operating winding 64w of the lower relay 64 will now be shunted down over a circuit which has previously been traced. The lower relay 64 is then restored to the non-operated position and, at contact members 64b, the short circuit around the operating winding 53w of the control relay 53 is removed. The operating winding 53w is then energized over a circuit which has previously been traced, due to the fact that the contact members 52c of the auxiliary line relay are still closed despite the fact that the operating relay 52 has been deenergized. The control relay 53 is then operated and provides a circuit for holding itself in, which has previously been traced.

Assuming now that the time has elapsed for the movement of the contact members of the auxiliary line relay 52 to the non-operated position, the circuit which has previously been traced for energizing the operating winding 63w of the raise relay 63 is now completed and the scale 55 is rotated to indicate a rise in the level of the liquid 11.

Since certain further changes may be made in the foregoing construction, and different embodiments of the invention may be made without departing from the scope thereof, it is intended that all matter set forth in the preceding description, or shown in the accompanying drawing, shall be interpreted as illustrative and not in a limiting sense.

We claim as our invention:

1. A remote signaling system for indicating at a distant station the magnitude of a quantity at another station comprising, in combination, a signaling circuit connecting the stations, means responsive to different variations in the magnitude of the quantity for applying a different succession of impulses to the signaling circuit individual to the said variations in magnitude, and means connected to the signaling circuit at the distant station and disposed to be responsive to the impulses applied thereto.

2. A remote signaling system for indicating at a distant station the magnitude of a quantity at another station comprising, in combination, a signaling circuit connecting the stations, means responsive to the increase and decrease in magnitude of the quantity for applying a different succession of impulses to the signaling circuit individual to the increase and decrease in magnitude, means at the distant station connected to be individually responsive to the impulses applied to the signaling circuit, and means responsive to the functioning of said last named means for indicating the magnitude of the quantity.

3. A remote signaling system for indicating at a first station the variations in magnitude of a quantity at a second station comprising, in combination, a signaling circuit connecting the stations, circuit control means connected to the signaling circuit at the second station and disposed to be operated in one sequence when the quantity increases in magnitude and in another sequence when the quantity decreases in magnitude, and indicating means connected to the signaling circuit at the first station and disposed to be responsive to the sequential functioning of said control means for indicating the magnitude of the quantity.

4. A remote signaling system for indicating at a distant station the magnitude of a variable quantity at another station comprising, in combination, a signaling circuit connecting the stations, control means connected to apply impulses to the signaling circuit in one sequence on an increase in the magnitude of the quantity and in another sequence on a decrease in the magnitude of said quantity, and indicating means connected to the signaling circuit at the distant station and disposed to be responsive to the sequential application of said impulses for indicating the magnitude of the quantity.

5. A remote signaling system for indicating at a distant station the level of the magnitude of a variable quantity at another station comprising, in combination, a signaling circuit connecting the stations, control means connected to apply impulses to the signaling circuit in one sequence on an increase in the magnitude of the quantity and in another sequence on a decrease in the magnitude of said quantity, indicating means at the distant station for showing the magnitude of the quantity, means connected to the signaling circuit and responsive to one sequence of impulses for operating said indicating means to show an increase in magnitude, and means connected to the signaling circuit and responsive to the other sequence of impulses for operating said indicating means to show a decrease in magnitude.

6. A remote signaling system for indicating at a distant station the magnitude of a variable quantity at another station comprising, in combination, a signaling circuit connecting the stations, a source of alternating current connected to said circuit, a pair of rectifiers oppositely connected in said circuit at said other station, switch means individual to each rectifier and disposed to connect said rectifiers in said circuit to apply impulses of different polarity in one sequence when the magnitude of the quantity increases and in another sequence when the magnitude decreases, indicating means at the distant station for showing the magnitude of the quantity, means connected to the signaling circuit and responsive to one sequence of impulses for operating said indicating means to show an increase in the magnitude of the quantity, and means connected to the signaling circuit and responsive to the other sequence of impulses for operating said indicating means to show a decrease in the magnitude of said quantity.

7. A remote signaling system for indicating at a distant station the magnitude of a variable quantity at another station comprising, in combination, a signaling circuit connecting the stations, a source of alternating current connected to said circuit, a pair of rectifiers oppositely connected in said circuit at said other station, switch means individual to each rectifier and disposed to connect said rectifiers in said circuit to apply impulses of different polarity in one sequence when the magnitude increases and in another sequence when the magnitude decreases, indicating means at the distant station for showing the magnitude of the quantity, and polarized relay means connected to the signaling circuit and disposed to effect the operation of said indicating means to show an increase in magnitude on reception of one sequence of impulses and a decrease in magnitude on reception of the other sequence of impulses.

8. A remote signaling system for indicating at a distant station the magnitude of a variable quantity at another station comprising in combination, a signaling circuit connecting the stations, a source of alternating current connected to said circuit, a pair of rectifiers oppositely connected in said circuit at said other station, switch means individual to each rectifier and disposed to connect said rectifiers in said circuit to apply impulses of different polarity in one sequence when the magnitude increases and in another sequence when the magnitude decreases, indicating means at the distant station for showing the magnitude of the quantity, and a pair of polarized relays oppositely connected in said circuit at the distant station, said relays being operable in one sequence on application of one sequence of impulses to effect the operation of said indicating means to show an increase in magnitude and operable in another sequence on application of the other sequence of impulses to effect the operation of said indicating means to show a decrease in magnitude.

9. A remote signaling system for indicating at a distant station the magnitude of a variable quantity at another station, comprising, in combination, a signaling circuit connecting the stations, a source of alternating current connected to said circuit, a pair of rectifiers oppositely connected to said circuit at said other station, switch means individual to each rectifier for connecting them in said circuit, cam means operable in accordance with the change in magnitude of the quantity and disposed to operate said switch means in one sequence on increased magnitude and in another sequence on decreased magnitude thereby connecting and disconnecting said rectifiers into and out of said circuit in corresponding sequences, indicating means at the distant station for showing the magnitude of the quantity, means connected to the signaling circuit and responsive to one sequence of impulses for operating said indicating means to show an increase in magnitude, and means connected to the signaling circuit and responsive to the other sequence of impulses for operating said indicating means to show a decrease in magnitude.

10. A remote signaling system for indicating at a distant station the magnitude of a variable quantity at another station, comprising, in combination, a signaling circuit connecting the stations, a source of alternating current connected to said circuit, a pair of rectifiers oppositely connected to said circuit at said other station, switch means individual to each rectifier for connecting them in said circuit, cam means operable in accordance with the change in magnitude of the quantity and disposed to operate said switch means in one sequence on increased magnitude and in another sequence on decreased magnitude thereby connecting and disconnecting said rectifiers into and out of said circuit in corresponding sequences, indicating means at the distant station for showing the magnitude of the quantity, and polarized relay means connected to the signaling circuit and disposed to effect the operation of said indicating means to show an increase in magnitude on reception of one sequence of impulses and a decrease in magnitude on reception of the other sequence of impulses.

11. A remote signaling system for indicating at a receiving station the magnitude of a variable quantity at a sending station, comprising, in combination, a signaling circuit connecting the stations, a source of alternating current connected to said circuit, a pair of rectifiers oppositely connected to said circuit at the sending station, switch means individual to each rectifier for connecting them in said circuit, cam means operable in accordance with the change in magnitude of the quantity and disposed to operate said switch means in one sequence on increased magnitude and in another sequence on decreased magnitude thereby connecting and disconnecting said rectifiers into and out of said circuit in corresponding sequences, indicating means at the receiving station for showing the magnitude of the quantity, and a pair of polarized relays oppositely connected in said circuit at the receiving station, said relays being operable in one sequence on application of one sequence of impulses to effect the operation of said indicating means to show an increase in magnitude of the quantity and operable in another sequence on application of the other sequence of impulses to effect the operation of said indicating means to show a decrease in the magnitude of said quantity.

12. A remote signaling system for indicating at a first station the magnitude of a variable quantity at a second station comprising, in combination, a signaling circuit connecting the stations, means for applying and removing positive and negative impulses to and from said circuit at the second station in one sequence on an increase in magnitude of the quantity and in another sequence on a decrease in magnitude thereof, indicating means at the first station for showing the magnitude of the quantity, polarized relay means connected to said circuit at the first station and disposed to be operated on application of a positive and a negative impulse to condition circuit means for operating said indicating means, and means responsive to the removal of either the positive or the negative impulse for effecting the operation of said indicating means over said circuit means to show an increase or decrease in the magnitude of the quantity.

13. A remote signaling system for indicating at a distant station the magnitude of a variable quantity at a sending station comprising, in combination, a signaling circuit connecting the stations, means for applying and removing positive and negative impulses to and from said circuit at the sending station in one sequence on an increase in magnitude of the quantity and in another sequence on a decrease in magnitude thereof, indicating means at the distant station for showing the magnitude of the quantity and a pair of polarized relays oppositely connected in said circuit at the distant station, said polarized relays being disposed when simultaneously operated to condition circuit means for operating said indicating means in response to the removal of either the positive or the negative impulse for effecting the operation of said indicating means to show an increase or decrease in the magnitude of the quantity.

CHARLES P. WEST.
BURT S. BURKE.